(12) United States Patent
Doskow et al.

(10) Patent No.: US 7,003,080 B1
(45) Date of Patent: Feb. 21, 2006

(54) METHODS AND APPARATUS FOR REDUCING DATA CAPTURE AND STORAGE REQUIREMENTS FOR CALL AND TRANSACTION RELATED MESSAGE MONITORING AND FRAUD DETECTION

(75) Inventors: Arthur Doskow, New York, NY (US); Harry A. Hetz, Silver Spring, MD (US); George Robert Hasenauer, Silver Spring, MD (US); Erik George Gebhardt, Clifton Park, NY (US); Joseph Vecchioli, Herndon, VA (US)

(73) Assignee: Verizon Services Corp., Arlington, VA (US)

( * ) Notice: Subject to any disclaimer, the term of this patent is extended or adjusted under 35 U.S.C. 154(b) by 0 days.

(21) Appl. No.: 10/948,515

(22) Filed: Sep. 23, 2004

(51) Int. Cl.
*H04M 1/24* (2006.01)
*H04M 15/00* (2006.01)

(52) U.S. Cl. .............................. 379/32.03; 379/32.01; 379/112.01

(58) Field of Classification Search ........... 379/112.01, 379/32.01, 32.03, 32.04, 1.01, 15.02, 111, 379/112.06, 112.07, 112.08, 112.09, 112.1, 379/133, 134, 136, 137, 138, 139
See application file for complete search history.

(56) References Cited

U.S. PATENT DOCUMENTS

| | | | |
|---|---|---|---|
| 6,233,313 B1 | 5/2001 | Farris et al. | |
| 6,282,267 B1 | 8/2001 | Nolting | |
| 6,298,123 B1 | 10/2001 | Nolting et al. | |
| 6,327,350 B1 * | 12/2001 | Spangler et al. | 379/115.01 |
| 6,351,453 B1 | 2/2002 | Nolting et al. | |
| 6,385,301 B1 | 5/2002 | Nolting et al. | |
| 6,411,681 B1 | 6/2002 | Nolting et al. | |
| 6,504,907 B1 | 1/2003 | Farris et al. | |
| 6,765,990 B1 * | 7/2004 | Freedman et al. | 379/32.05 |
| 2003/0142803 A1 * | 7/2003 | Freedman et al. | 379/114.14 |
| 2005/0047569 A1 * | 3/2005 | Moisey et al. | 379/126 |
| 2005/0111640 A1 * | 5/2005 | Moisey et al. | 379/114.2 |
| 2005/0185777 A1 * | 8/2005 | Russell et al. | 379/111 |

* cited by examiner

*Primary Examiner*—Rexford Barnie
(74) *Attorney, Agent, or Firm*—Leonard C. Suchyta, Esq.; Straub & Pokotylo

(57) ABSTRACT

Systems for monitoring, storage, and analysis of information in signaling messages, communicated from originating networks to a destination network through one or more intermediate networks are described. Correlation and comparison between signaling messages of interest sent from an origination network to signaling messages received by the destination network allows for the detection of inconsistent information, e.g., information fields in a communicated message that have been altered, either intentionally or unintentionally, by an intermediate carrier. The introduction of an additional communications path over which notification messages are forwarded from signaling monitoring equipment in the origination network to signaling monitoring equipment in the destination network allows for a significant reduction in the memory storage requirements at the destination network and in the amount of processing required to match, compare, and evaluate signaling messages. In addition, the reduction in stored messages and processing time allows the monitoring system to operate in near-real time allowing for fraud detection while a call is still in progress.

25 Claims, 10 Drawing Sheets

METHODS AND APPARATUS FOR REDUCING DATA CAPTURE AND STORAGE REQUIREMENTS FOR CALL AND TRANSACTION RELATED MESSAGE MONITORING AND FRAUD DETECTION

FIELD OF THE INVENTION

The present invention relates generally to the field of telephone communications and, more particularly, to the field of monitoring, capturing, correlating, and comparing signaling messages exchanged between indirectly connected network segments.

BACKGROUND

In telephony today, the signaling messages and information used to: (i) establish and tear down a call, and (ii) to conduct transactions, often pass through one or more intermediary networks, e.g., interchange carriers, hub providers, on the way from their originator to their intended destination. Carriers, e.g., local carriers, have a number of reasons to implement call and transaction monitoring systems that collect, correlate, and compare the information that leaves an originating network with the information that enters a terminating network. These reasons include: maintaining and monitoring service assurance, troubleshooting problems, and detecting fraudulent manipulation of signaling information. Signaling messages and information for analysis are often collected by trapping and storing messages sent from a number of different sources towards a common destination or set of destinations. Those destinations could be anything from single telephone number to a set of telephone end offices, or even to all the switches in a Local Access and Transport Area (LATA). Because of the possibility that some identifying information within these messages may be modified or removed, it has been necessary to trap and save messages, e.g., all messages of the type being monitored e.g., call setup, addressed to the targeted destinations. The correlation of messages trapped by both the originating and terminating networks normally takes place offline and after the fact. Messages from the originating network can be selected for storage, based on their characteristics e.g., called number, thus limiting the number of messages that must be collected and stored by the originating network. In contrast, the relevance of messages entering the terminating network is not immediately clear, and is only determined through subsequent processing. As a result, a large number of messages, irrelevant to a particular study, are often collected at the terminating network along with those messages that are relevant. This may present logistical difficulties with regard to both the storage required to hold the saved messages, as well as the additional processing required to analyze them.

Currently, at least one known telephone carrier tracks and logs information on all calls (both originating and terminating) that pass through monitored portions of their network at different network locations. This results in information being logged for many calls where no corresponding source/destination information will be available, since the calls may originate or terminate at a different carrier's network or an unmonitored portion of the monitoring carrier's own network. Logs generated by the deployed monitoring equipment are collected into a large database and then processed offline to correlate calls leaving and re-entering the known telephone carrier's network. As discussed above, many calls and transactions for which data is collected either do not originate, or do not terminate within the monitored portions of the network(s). Thus there may be no correlation between many, if not most, of the many call setup and/or transaction messages collected from the originating and terminating networks. Originating and terminating data that can be correlated to document a call or transaction can be checked to determine whether any fields were inappropriately altered after leaving the originating telephone carrier's network prior to re-entry into the destination carrier's network.

The current monitoring and correlation system of the known telephone carrier, while effective, creates a huge volume of data that must be stored and then processed to correlate calls and/or transactions leaving and re-entering the known telephone carrier's network. The current existing known telephone carrier's system is a non-real time system since the call correlation process is done off-line, after data has been gathered and transferred to a common processing facility. The off-line processing is, in part, a reflection of the vast amounts of data that must be processed to correlate messages and/or transactions detected at different network locations. Thus, there will be some delay between when an inappropriate modification occurs and when it is actually detected.

FIG. 1 is a drawing of an exemplary communications system 100 using known data capture and storage methods and apparatus for call monitoring. System 100 includes a first origination network 102, a second origination network 104, a third origination network 106, an intermediate network 108, and a destination network 110. Calls, transactions and associated information from the first and second, networks 102, 104 are delivered to the destination network 110 through intermediate network 108 which interconnects origination networks 102, 104 to the destination network 110. Originating network 3, 106 connects both to the intermediate network, 108 and the destination network, 110. While calls and/or transactions from originating network 3 106 to destination network 110 are often signaled directly between the two networks, it is also possible for originating network 3, 106 to use an intermediate network 108 to reach the destination network 110. The switches 114, 122, 130, 134 are connected to local Signal Transfer Points (STPs) 113, 123, 133, 134, respectively, which may also include the corresponding signal monitoring equipment. Signaling information exchanged between networks is transferred over the signaling links, 144, 148, 148, 150 and various other links between origination network 3, 106 and destination network 110 connecting their respective STPs. Note that while the figure shows STPs being present in each network, smaller networks will often forgo deployment of STPs and instead connect their switches directly to the STPs of a larger carrier.

The destination network 110 is located in LATA 1 of state 1. Origination network 3, 106 is also located in LATA 1 of state 1. Calls and/or transactions from origination network 3, 106 directed to destination network 110 are considered local and are often signaled directly, rather than through an intermediate network. Origination network 2, 104 is located in LATA 2 of state 1. Calls and/or transactions from origination network 2, 104 placed to destination network 110 are considered intra-state, inter-LATA. Origination network 1, 102 is located in LATA 3 of state 2. Calls and/or transactions from origination network 1, 102 placed to destination network 110 are considered inter-state[Covered above].

Origination network 1, 102 includes at least one telephone 112, a switch 114, and signal monitoring equipment 116. It is also likely to include a pair of Signaling Transfer Points (STPs) 113. Similarly, origination network 2, 104 includes at least one telephone 120, a switch 122, and signal monitoring equipment 124 and most likely a pair of STPs 123. Origination network 3, 106 includes at least one telephone 128 and switch 130, and possibly a pair of STPs 133. Intermediate network 108, e.g., an interchange carrier includes switch 132 and a pair of STPs 135. Destination network 110 includes a switch 134, a plurality of telephones 136, 137, 138, received signaling monitoring equipment 140, a storage area 142 and most likely, a pair of STPs 143.

Deployed monitoring equipment can, and often does, monitor signaling for both originating and terminating calls. For purposes of explaining the invention, some monitoring equipments have been shown as monitoring call origination signaling exclusively, while others have been shown as monitoring only termination signaling.

A call is initiated from telephone 112 toward a phone in destination network 110, e.g., telephone 136, which results in switch 114 generating signaling message(s) 144, e.g., an SS7 Initial Address Message (IAM). Signaling messages 144, generated by and output from switch 114, are monitored by the signal monitoring test equipment, e.g., passive link-monitoring equipment, and selectively recorded in a log 118 by signal monitoring equipment 116. The selection may be based, e.g., on a called number or block of numbers associated with destination network 110. The signaling messages 144 are received by switch 132 of intermediate network 108. Certain information in the signaling message(s), e.g., information that will be used by destination network 110 to classify the call as long distance call should not be altered by intermediate network 108 during the forward routing, but may be altered. Such alterations may make the call appear to the destination network 110 as an intra-state interLATA, or local call, resulting in improper billing and a loss of revenue to destination network 110 due to fraud on the part of the intermediate network 108.

Alternatively, intermediate network 108 could forward the call to Origination network 3, 106, which could then pass it on to destination network 110. Such behavior, coupled with alterations to call signaling data can definitely give the call the appearance of a local call.

Similarly, when a call is initiated from telephone 120 to a phone in destination network 110, e.g., telephone 137, switch 122 generates signaling message(s) 146, e.g., an SS7 Initial Address Message (IAM). Signaling messages 146, originated by and output from switch 122, are monitored by the signal monitoring test equipment 124, e.g., link-monitoring equipment, and selectively recorded in a log 126 by signal monitoring equipment 124. The selection may be based, e.g., on a called number or block of numbers associated within destination network 110. The signaling messages 146 are received by switch 132 of intermediate network 108. Certain information in the signaling message(s), e.g., information that will be used by destination network 110 to classify the call as an intra-state interLATA call should not be altered by intermediate network 108 during the forward routing, but it sometimes is. Such alterations may make the call appear to the destination network 110 as a local call, or an interstate call, resulting in improper billing and a loss of revenue to destination network 110 due to fraud on the part of the intermediate network 108.

In some cases, when a call is initiated from telephone 128 in origination network 3, 106, toward a telephone in destination network 110, e.g., telephone 138, switch 130 generates signaling message(s) 148, e.g., an SS7 Initial Address Message (IAM). The signaling messages 148 are received by switch 132 of intermediate network 108.

Switch 132 of intermediate network 108, receives the signaling messages, e.g., IAM SS7 signaling messages from origination networks 102, 104, 106, processes the messages 144, 146, 148, and outputs signaling messages 150 directed to switch 134 of destination network 110. Received signal monitoring equipment 140 captures the incoming signaling messages 150, and stores the detected information in storage area 142, e.g., a high capacity storage device, for future processing and analysis. Received signal monitoring equipment 140 monitors the incoming calls and transactions, e.g., the SS7 messages, to the target portion of the network, e.g., directed to switch 134. Since the received signal monitoring equipment needs to account for the possibility that signaling information has been modified in transit, or that it may arrive over an unconventional route, it is obligated to collect and store incoming messages, e.g., all incoming SS7 messages, initiating a call or transaction to the targeted part of the network. As a result, the data storage requirements of the terminating network in storage area 142 are far greater than those of the originating network(s), e.g., logs 118, 126. The originating network 102, 104 need only save messages pointing toward the targeted portion of the terminating network 110, but the terminating network 110 needs to save all incoming messages that initiate either a call or a transaction.

System 100 also includes a processing center 152 including origination log information 154 and destination log information 156. Origination logs (118, 126) are communicated from origination networks (102, 104) via signals (158, 160) to the processing center 152 and stored in origination log information 154; information collected and stored in storage area 142 of the destination network 110 is transferred to destination log information 156 via path 162. The processing center 152 can subsequently use the information in logs 154, 156 to perform, after the fact, message correlation and analysis of the messages trapped by the originating networks 102, 104 and the messages trapped by the destination network 110.

The processing center 152 sorts through the destination log information 156 to identify received messages corresponding to transmitted messages in the origination log information 154. Correlation is performed by comparing portions of the originally transmitted messages to portions of the corresponding received destination messages that must remain unchanged in order to provide service, e.g., portions such as the Called Party Number for calls and the Transaction ID for transactions. In the process, many, if not most, of the messages collected by the destination network 110 are discarded as irrelevant. Then, the processing center 152 can perform a detailed comparison of portions of the correlated messages that should be identical in the originating and terminating messages, but which may have been altered as the signals traversed the intermediate network 108.

FIG. 2 is a drawing of an exemplary Initial Address Message (IAM) 200 which may be captured and analyzed. While IAMs are sent solely from one switch to the following switch on a call path, and not forwarded farther, the signaling information, used to set up a telephone connection is passed from switch-to-switch-to-switch, from the originating switch to the destination switch, e.g., switch 114-switch 132-switch 134, as a call is established. Message 200 includes a header 201, a called party number 202, a calling party's number (CPN) 204, a charged number (CN) 206, a jurisdictional information parameter (JIP) 208 and other additional information 210. The called party's number 202 indicates the destination telephone number in the destination network 110, e.g., the number corresponding to telephone 136. The CPN 204 corresponds to the number of the telephone from which the call was initiated, e.g., that of telephone 112 of origination network 102. CN 206 is the number to which the call is billed. The JIP 208 includes information indicating the jurisdiction from which the call was placed, e.g., information identifying origination network 102 located in LATA 3, state 2. Most or all of information 202, 204, 206, 208 included in the fields of IAM 200 are generally provided by the switch where the call originated, e.g., switch 114, with the expectation that they will be delivered unaltered to the terminating switch, e.g., switch 134. Such information 202, 204, 206, 208 in the IAM 200 may be supplemented by additional information 210, e.g., call characteristic information. The additional information 210 may include information provided by the originating switch 114, as well as information added by the successive switches in the path, e.g., switch 132.

In view of the above discussion, it is apparent that there is a need for methods and apparatus to provide a call monitoring system that reduces the volume of signaling messages that need to be captured, stored, and recorded by a terminating network. A reduction in volume would be beneficial over existing systems in terms of reducing storage and processing requirements. In addition, call monitoring systems that do not require enormous memory storage and processing capability should be more hardware efficient and cost-effective, and could be attractive to be employed to supplement existing deployed monitoring systems, e.g., in areas where the volume of traffic has not justified the purchase and deployment of equipment which records all of the signaling messages. New call monitoring systems with reduced storage and processing requirements might also be attractive for deployment with partner carriers, e.g., carriers working together to track fraud.

In addition, new methods and apparatus directed to call monitoring systems that can operate on a near real time basis would be well suited for fraud detection.

SUMMARY

Figure 1:
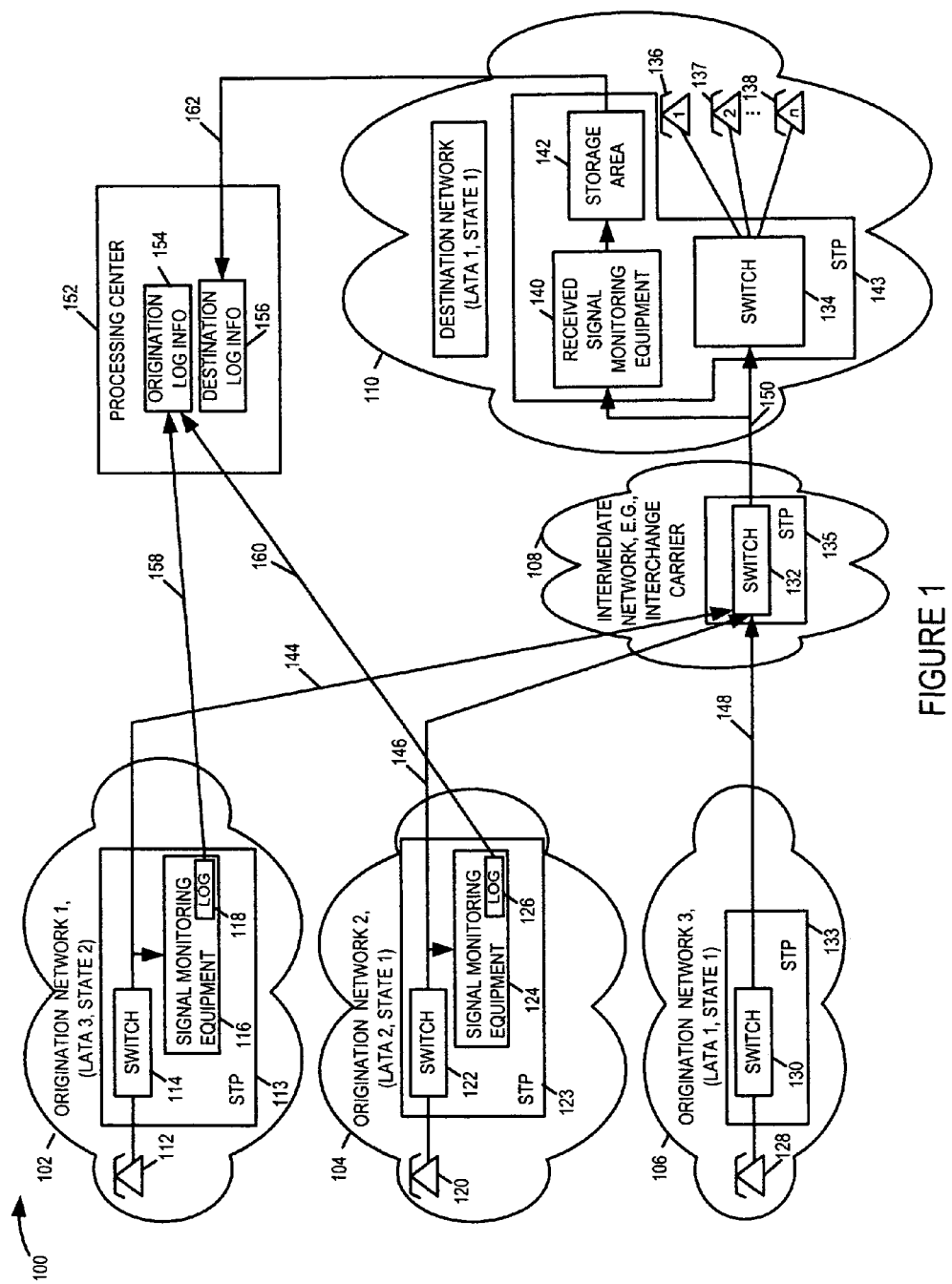
FIG. 1 is a drawing of an exemplary communications system using known data capture and storage methods and apparatus for call monitoring.
Figure 2:
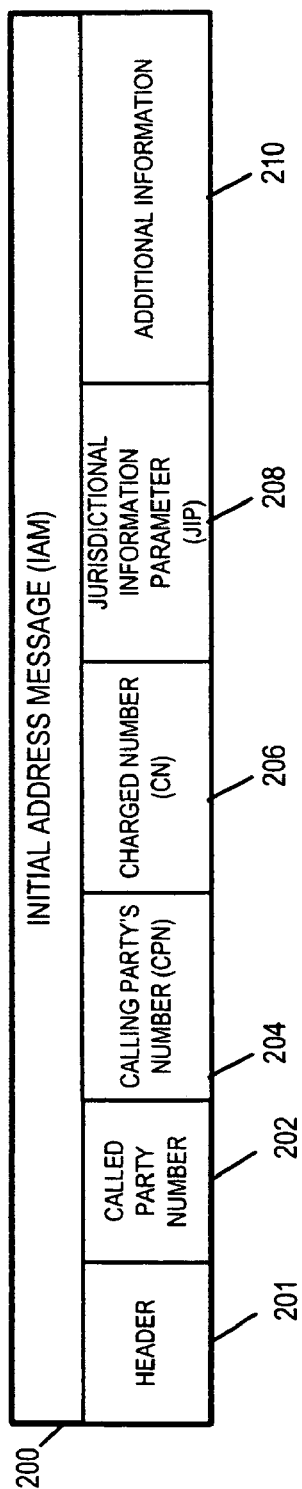
FIG. 2 is a drawing of an exemplary Initial Address Message (IAM) illustrated for purposes of explaining the invention.

The methods and apparatus of the present invention can be used to implement a call signaling monitoring system, e.g., a real-time or near real-time call monitoring system, which can be used to detect fraud and/or errors which cause call-related information to be intentionally or erroneously altered or discarded between the point where a call leaves one network (or portion thereof) and enters the same or another network. Not only can the method of the invention accelerate fraud detection as compared to the exiting non-real time system, but it can be implemented with reduced hardware requirements since less data needs to be stored than in the existing system. Call completion failures can also be targeted for real or near-real time detection using the system of the invention, leading to rapid network fault detection. The monitoring method of the invention can be used with live call traffic as well as test calls. Thus, while test calls may be used, they are not necessary to the method of the invention.

In accordance with some embodiments of the invention, a destination network, or portion thereof, is selected for monitoring. Call signal monitoring equipment is installed in the destination network to monitor and log information related to incoming calls placed to the destination network or designated portion thereof, e.g., all calls to a specific set of numbers, or calls identified for monitoring by a management signal. Call signal monitoring equipment is also installed in one or more networks ("source networks") from which calls directed to the destination network or portion thereof are expected to originate. The source and destination networks may correspond to networks operated by different carriers. Alternatively, the source and destination networks may correspond to different portions of the same carrier's network. In this case, the source network corresponds to a first region of the carrier's network from which intermediate carrier(s) are used to reach a second region of the carrier's network, i.e., the destination network. In such a case, the source and destination networks are portions of a single carrier's larger network. For example, the source and destination networks may be owned by the same carrier and located in different states, with the network(s) of different carrier(s) interconnecting them. Call signal monitoring equipment in the source network is configured to detect calls directed to the destination network based on called number information, e.g., the area code of the called number matching an area code of the destination network being monitored.

In some embodiments, the monitoring equipment in the source network is coupled to the monitoring equipment in the destination network by a service management network. When the monitoring equipment in the source network detects a call to the destination network, it logs information concerning the call. While the call is routed in the usual manner between the source and destination networks, the monitoring equipment in the source network sends a signal to the monitoring equipment in the destination network. The signal indicates that a call of interest was detected in the source network and that information was collected. At a minimum, it also indicates the specific telephone number to which the call was placed. It may also provide additional details of the information sent in the call setup signaling. The monitoring equipment in the destination network monitors the signaling associated with incoming calls to the destination network. This monitoring equipment temporarily stores information on each incoming call, e.g., in a buffer. When it receives a signal from the monitoring equipment in the source network that a call has been placed to a specific telephone number, it searches both the buffered signaling associated with recently received calls, as well as current signaling, as it is received, for the corresponding incoming call. Thus, regardless of whether the management signal identifying a monitored call arrives before or after the call, itself, call information will still be collected in the destination network. In response to receiving the signal, from the source network monitoring equipment, identifying a particular monitored call, the monitoring equipment in the destination network logs the information corresponding to the call into long-term storage. Monitoring information associated with other calls, if initially stored, is normally deleted. The stored information regarding the calls identified by the monitoring equipment in the destination network is transferred to a database where call information logged by the source network monitoring equipment is also stored. The information can then be analyzed to check for fraudulent and/or erroneous changes to call information between the time a call leaves the source network and the time it enters the destination network. Alternatively, if the monitoring equipment in the source network provides extensive information about the call in its signal to the monitoring equipment in the destination network, then it may be possible for the monitoring equipment in the destination network to make a real time, or near real time determination as to whether call signaling information was either modified or deleted. In this implementation, it may be possible to detect fraudulent activity while a suspect call is still ongoing. Such real time fraud detection is performed in some embodiments. Failure to detect entry of a call into the destination network following a signal from the source network indicates a possible call routing failure, information that is of value to the involved networks. Both ordinary and test calls may be tracked using the novel fraud detection system of the invention.

The method of the present invention involves the passing of information, e.g., in one or more messages, from the monitoring equipment in the source network to that in the destination network. This information may be and often is passed separate and apart from the signaling used to set up and tear down calls themselves, and requires a connection that allows direct communication between source and destination monitoring equipment. However, it has the advantage, compared to the known system, in which signaling for all calls to the destination network are monitored and logged for further analysis, of reducing the amount of data storage capacity and subsequent processing resources required to detect call fraud or other anomalies relating to calls placed from a source network to a destination network area of interest. Thus, the methods of the present invention are well suited for real-time or near real-time fraud detection and/or for cases where storage capacity may be an issue. The methods and apparatus of the present invention may offer a cost effective and hardware efficient solution to the issue of fraud monitoring and/or trouble detection. Thus, the methods of the present invention are well suited for areas where the volume of network traffic does not justify the cost of deploying equipment capable of monitoring, logging and processing of information corresponding to all calls. The message passing/call monitoring methods of the present invention can be used as a supplement to a partially deployed exhaustive call monitoring system and/or as a cost effective/hardware efficient alternative to such a system.

The fraud detection methods of the present invention may be more attractive to partner network providers who agree to jointly work with a service provider to detect fraud than the known comprehensive monitoring system. This is because the monitoring hardware may be less expensive than in the case where all incoming call signaling must be monitored and logged. Additionally, neither party needs to be provided with the full set of information about calls terminated on the other party's network which would normally be used to correlate calls being passed between the two networks in the more comprehensive monitoring system.

One feature of the present invention is the establishment and use of an additional communications path between the monitoring equipment in the originating network, e.g., the source of a call and related signaling messages, and the monitoring equipment in the terminating network, e.g., the network to which the observed calls are placed. The use of this additional communications path allows the data collection requirements at the terminating network to be reduced. When the monitoring equipment in the originating network determines that the originating network has forwarded signaling, e.g., a signaling message of interest, towards the targeted portion of the terminating network over its usual e.g., normal, signaling path, it generates a notification message towards the monitoring equipment in the terminating network, sends the notification message over this additional communications path. The additional communications path is an independent, and in some embodiments direct, communications path between the two sets of monitoring equipment (i.e., not the same path that is used for call setup signaling, e.g., SS7 signaling). Different embodiments of the invention may employ different apparatus, technologies, configurations, techniques, and/or protocols for this additional communications path between the monitoring equipment in the origination network and the monitoring equipment in the destination network; however, this additional communication path should provide for the fast and reliable exchange of messages.

The notification message alerts the monitoring equipment in the terminating network to the proximate arrival, either recent or forthcoming, of a signaling message of interest, e.g., a SS7 IAM message. In some embodiments, the notification is a simple indication that a signaling message of interest has been sent. In some embodiments, the notification message provides additional information to identify the specific signaling message of interest when it arrives at the terminating network, e.g., information such as the called telephone number. In some embodiments, the notification message includes a copy of the signaling message of interest or the pertinent information from the signaling message of interest that should be checked for inconsistencies.

In some embodiments of the present invention, the destination network monitoring equipment has a limited capacity temporary buffer, e.g., a rolling buffer, into which captured received signaling messages are written. In general, at any instant of time this limited temporary buffer contains received signaling messages from calls received within a relatively narrow time frame. Processing of data in the temporary buffer for copying into long-term storage occurs when it is triggered by the reception of a notification message. Absent the receipt of a notification message, there is no need to preserve the buffered data, and so it is allowed to be overwritten without being saved. This approach results in an overall decrease in the requirements for long-term storage. There is uncertainty as to which message, the notification message or the actual monitored signaling message of interest (e.g. call or transaction establishment message) will arrive first at the terminating network's monitoring equipment; therefore, the terminating network's monitoring equipment waits for a short interval after the receipt of the notification message before processing the data in the temporary buffer for storage. This greatly increases the likelihood that the signaling message of interest will be in the temporary buffer when processing starts. This waiting interval may, and sometimes, is governed by characteristics of the monitoring environment, e.g., expected call signaling routing delays, size of temporary buffer, delays in the delivery of the notification message, type of processing to be performed by the monitoring equipment, etc.

The processing of data from the temporary buffer prior to storage in long-term memory may vary depending upon the information included in the notification message and the configuration of the terminating network's monitoring equipment. In one exemplary method, the notification message provides a simple indication that a signaling message of interest has been sent, but does not include enough information to specifically identify the message of interest on arrival. In this method, the destination network monitoring equipment dumps the entire contents of the temporary buffer to long-term storage, e.g., to be sorted through, correlated, and analyzed later by, e.g., a processing center in a management network. In another exemplary method, the notification message includes specific information, e.g., a called party number or a transaction ID, allowing the identification of the signaling message of interest on its arrival. This allows the destination network's monitoring equipment to search the temporary buffer for the corresponding received message and, on finding it, dump that message (or that message and subsequent related messages) to long-term storage.

Both exemplary methods, in accordance with the present invention, can provide a significant reduction in the volume of data collected for analysis by the terminating network over known methods currently employed without negatively impacting the collection of relevant data. In either event, this communication of a notification message, in accordance with the invention, allows the monitoring equipment in the terminating network to discard messages not relevant to the particular study. Many, if not most, of the received signaling messages may be discarded. This discarding of irrelevant messages thus saves both storage space and subsequent processing time over known monitoring methods and systems.

The second exemplary method, in which the notification message includes information to allow identification of the signaling message(s) of interest identification information, produces a greater reduction in the volume of stored data, but at a cost of increasing the processing requirement on the monitoring equipment itself and increasing the amount of information communicated in the notification message, compared to the approach of the first exemplary method.

In some other embodiments, e.g., those in which the notification message conveys a copy of the signaling message of interest or the relevant information from that message, not only the correlation, but the actual checking of the contents of the received signaling message may be performed by the destination network signal monitoring system, itself, e.g., in real time or near real time. In other embodiments, the messages recorded in long-term storage by the monitoring equipment in the destination network shall be communicated as a log to a processing center, e.g., in a management network, where analysis and comparison checks for consistency can be performed at a later time using the corresponding log generated by the originating network monitoring equipment.

In some embodiments, the origination networks and monitoring systems, the destination network and monitoring system, and a management network all belong to a single carrier, e.g., a local carrier with different Metropolitan Serving Areas (MSAs). In other embodiments, origination networks and monitoring systems, the destination network and monitoring system, and the management network are owned by several cooperating carriers, e.g., any types of carriers that originate and/or terminate call traffic that have reached an agreement or contractual arrangement. In some embodiments, the monitoring system in the destination network includes message analysis capabilities, and a processing facility to log and process messages in the management network may not be necessary. In some embodiments, the notification messages are not routed through a management network, but are still routed through a different path than that used for the call setup signals being monitored. In some embodiments multiple notification messages, e.g., two or more may be conveyed corresponding to a message of interest. For example, a first notification message may be used to convey that a signaling message of interest is in route, a second notification message may be used to convey specific message identification information, and a third notification message may be used to convey information to be compared for inconsistency. Rather than using 3 messages this information can alternatively be conveyed using two messages.

In some embodiments, a signal monitoring system in a given network segment or region, includes both originating signal monitoring capabilities and destination signal monitoring capabilities, and the implementation may be such as to jointly use equipment where possible. In some embodiments, portions of the overall monitoring system may utilize commercially available components such as, e.g., passive link-monitoring equipment.

Various origination and destination monitoring points, such as end-office switches, Signaling Transfer Points (STPs), etc. may be selected for the placement of monitoring equipment in accordance with the invention. In some embodiments, the monitoring equipment is advantageously placed on elements near an inter-network boundary, e.g., interfacing to an Inter-Exchange Carrier (IXC), rather than on each switch in a given area, thus limiting the total number of monitoring points and the amount of monitoring equipment used.

Although the system and methods of the invention have been described in exemplary embodiments in the context of SS7 signaling, the invention is applicable and may be used in other communications networks, e.g., IP networks, and hybrid networks, e.g., networks in which SS7 signals are transported across an IP intermediate network using Streaming Control Transport Protocol (SCTP) or other similar transport protocols, e.g., Transmission Control Protocol (TCP) and User Datagram Protocol (UDP).

In some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s).

DETAILED DESCRIPTION

Figure 3:
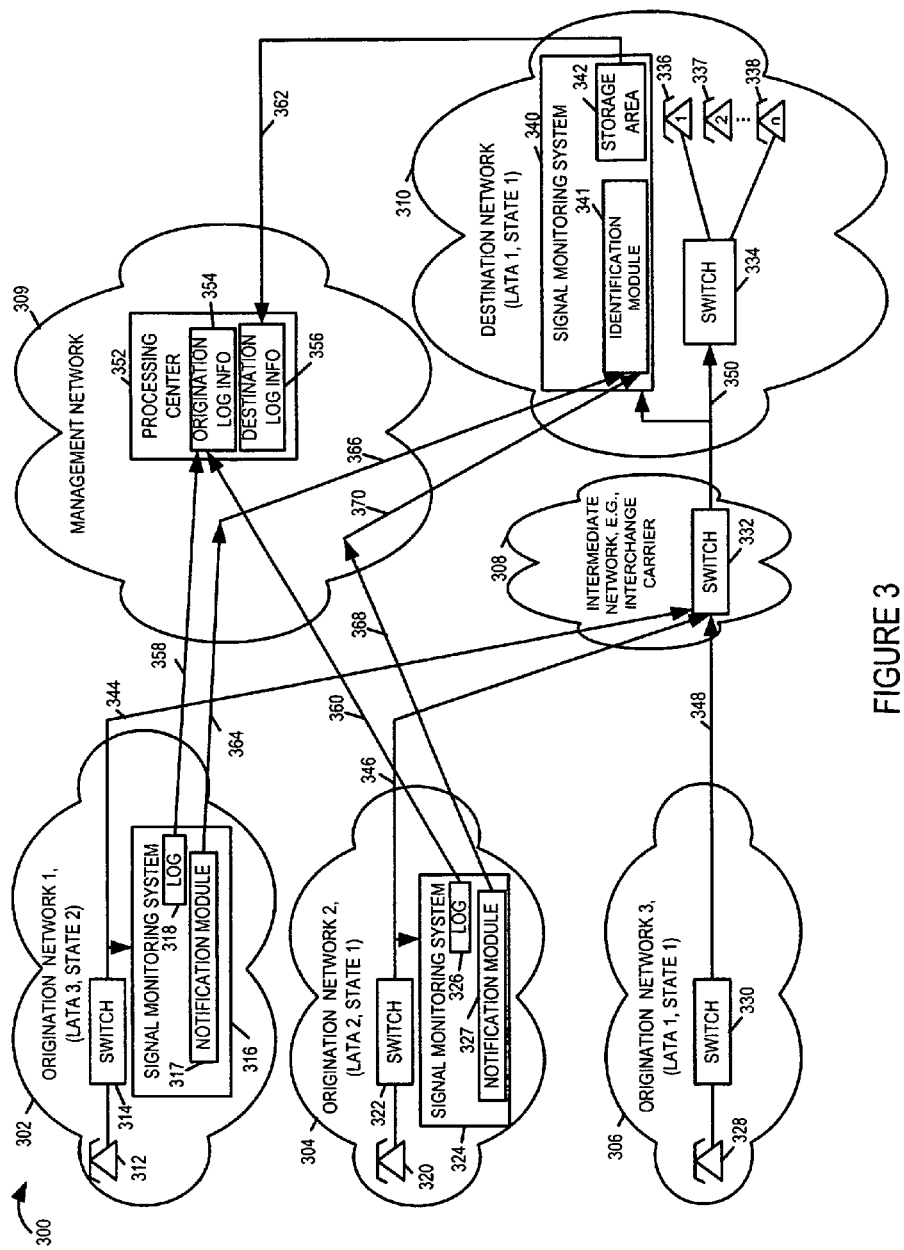
FIG. 3 is a drawing of an exemplary communications system for call monitoring using apparatus and methods in accordance with the present invention.

FIG. 3 is a drawing of an exemplary communications system 300 for call monitoring using apparatus and methods in accordance with the present invention. System 300 includes a first origination network 302, a second origination network 304, a third origination network 306, an intermediate network 308, and a destination network 310. Subscribers in the first, second, and third origination networks 302, 304, 306 can place calls to subscribers in destination network 310 via intermediate network 308 which couples the first, second, and third networks 302, 304, 306 to destination network 310. In FIG. 3 each of the different LATAs corresponds to a different local area.

The destination network 310 is located in LATA 1 of state 1. Origination network 3, 306 is also located in LATA 1 of state 1. Calls from origination network 3, 306 directed to destination network 310 are considered local calls. Origination network 2, 304 is located in LATA 2 of state 1. Calls from origination network 2, 304 directed to destination network 310 are considered intra-state, inter-LATA toll calls. Origination network 1 302 is located in LATA 3 of state 2. Calls from origination network 1, 302 directed to destination network 310 are considered inter-state, e.g., long distance calls.

Origination network 1, 302 includes at least one telephone 312, a switch 314, and signal monitoring system 316. Similarly, origination network 2, 304 includes at least one telephone 320, a switch 322, and signal monitoring system 324. Origination network 3, 306 includes at least one telephone 328 and switch 330. Intermediate network 308, e.g., an interchange carrier, includes switch 332. Destination network 310 includes a switch 334, a plurality of telephones 336, 337, 338, and signal monitoring system 340. Signal monitoring system 340 includes an identification module 341 and storage area 342.

Although for the purposes of explaining the invention, each origination network (302, 304, 306) has been illustrated with one telephone (312, 320, 328), in general, each of the origination networks (302, 304, 306) includes a plurality of telephones that are coupled to their network's respective switch (314, 316, 318). In many cases, these networks will also contain a plurality of switches. In addition, origination network 3, 306 may also include a signal monitoring system similar to systems 316, 324. In the FIG. 3 embodiment the monitoring equipment is shown associated with a network switch. It can also be co-located with network STPs. Such a monitoring system, in the same local region, e.g., same LATA, with respect to destination network 310 may be useful for purposes of quality assurance tracking and troubleshooting problems. System 300 facilitates the collection and analysis of information contained in signaling messages that are sent from the origination networks (302, 304, 306) to the destination network 310, i.e., through one or more intermediate networks, e.g., intermediate network 308. For purposes of explaining the invention, the network from which a call or transaction is initiated is referred to as an originating network, while the network in which the call or transaction terminates is called the terminating or destination network. The designation as "originating" or "terminating" is assigned with respect to a given call or transaction, and is used for purposes of explaining the invention. In general, each network, e.g., networks 302, 304, 306, and 310 can act as both an origination network and a destination network.

System 300 also includes a management network 309 including a processing center 352. Management network 309 routes monitoring notification signals, receives monitoring log information, and performs correlation and comparison of monitored log information.

Based on user input, e.g., from a local administrator, a decision is conveyed to the signal monitoring system 316 of origination network 1, 302, as to which signals are to be monitored. The selection may be based, e.g., on a telephone number or block of numbers associated with destination network 310. A call is initiated from telephone 312 toward a telephone in destination network 310, e.g., telephone 336, which results in switch 314 generating signaling message(s) 344, e.g., an SS7 IAM. Signal monitoring system 316 identifies the initiated call as one that should be tracked and forwards the information to its notification module 317.

Notification module 317 sends information indicative of the event providing notification of the imminent IAM signaling message in message 364, sent to the management network 309. Management network 309 forwards the information in message 366 to the identification module 341 in destination network 310. Signaling messages 344, output from switch 314, are monitored by the signal monitoring system 316, e.g., using passive link-monitoring equipment, and the pertinent signals are selectively recorded and captured in a log 318 by signal monitoring system 316. The signaling messages 344 are received by switch 332 of intermediate network 308. Certain information in the signaling message(s), e.g., information that will be used by destination network 310 to classify the call as a long distance call should be forwarded to switch 334 in network 310 without modification. The purpose of monitoring under current and proposed methods is to ensure that no such modification takes place. Such modifications could make the call appear to the destination network 310 as a local call, resulting in improper billing and a loss of revenue to destination network 310.

Similarly, based on user input, e.g., from a local administrator, a decision is conveyed to the signal monitoring system 324 of origination network 2, 304 as to which signals are to be monitored. The selection may be based, e.g., on a telephone number or block of numbers associated with destination network 310. A call is initiated from telephone 320 toward a telephone in destination network 310, e.g., telephone 337 which results in switch 322 generating signaling message(s) 346, e.g., an SS7 IAM. Signal monitoring system 324 identifies the initiated call as one that should be tracked and forwards the information to its notification module 327.

Notification module 327 sends information indicative of the event providing notification of the imminent IAM signaling in message 368 to the management network 309. Management network 309 forwards the information in message 370 to the identification module 341 in destination network 310. Signaling messages 346, output from switch 322, are monitored by the signal monitoring system 324, e.g., using link-monitoring equipment, and the pertinent signals are selectively recorded and captured in a log 326 by signal monitoring system 324. The signaling messages 346 are received by switch 332 of intermediate network 308. Certain information in the signaling message(s), e.g., information that will be used by destination network 310 to classify the call as an intra-state call can be inappropriately altered by intermediate network 308 during the forward routing. Such alterations may make the call appear to the destination network 310 as a local call, resulting in improper billing and a loss of revenue to destination network 310 due to fraud on the part of the intermediate network.

When a call is initiated from telephone 328 of origination network 3, 306 toward a telephone in destination network 310, e.g., telephone 338, switch 330 generates signaling message(s) 348, e.g., an SS7 IAM. The signaling message(s) 348 are received by switch 332 of intermediate network 308.

Switch 332 of intermediate network 308, receives the signaling messages (344, 346, 348), e.g., IAM SS7 signaling messages from origination networks (302, 304, 306), respectively, processes the messages (344, 346, 348), and outputs signaling messages 350 directed to switch 334 of destination network 310.

Signal monitoring system 340 of destination network 310 is continuously monitoring the received signal flow 350 and placing the received messages in a temporary rolling buffer. Signal monitoring system 340 has been notified in advance or within a manageable time window of impending or recent messages within the signal flow 350 that should be captured, and the identification module 341 identifies the specific message(s) and/or identifies a block of messages and transfers the information from the rolling buffer into a more permanent storage area 342 for analysis. The storage area 342 is smaller in size, e.g., significantly smaller in size than storage areas used in known call monitoring system 100, since the notification messages 366, 370 provide the destination network 310 with identification information enabling a filtering operation to be performed on the received messages 350. In some embodiments, the filtered received messages of interest collected in storage area 342 may be evaluated by the signal monitoring system 340, based on information provided in the notification messages sent by 317 and 327. This analysis can take place in real time or near real time, thus providing the possibility of detecting fraud while the initiated call is still in progress. In other embodiments or in addition, the data stored in storage area 342 is transferred to a processing center 352 within the management network 309.

Processing center 352 includes origination log information 354 and destination log information 356. Origination logs (318, 326) are communicated from origination networks (302, 304) via signals (358, 360) to the processing center 352 and stored in origination log information 354; information collected and stored in storage area 342 of the destination network 310 is transferred to destination log information 356 via messages 362. The processing center 352 can subsequently use the information in logs 354, 356 to perform message correlation and analysis of the messages trapped by the originating networks 302, 304 and the messages trapped by the destination network 310.

The processing center 352 sorts through the destination log information 356 to identify received messages corresponding to transmitted messages in the origination log information 354. Correlation is performed using message time stamps and by comparing portions of the transmitted origination messages to portions of the corresponding received destination messages that must remain unchanged in order to provide service, e.g., the Called Party Number in an SS7 IAM for calls, the Point Code in the Calling Party Address of an SS7 SCCP message, and the Transaction ID for transactions. Then, the processing center can perform a detailed comparison of the other portions of the correlated transmitted and received messages to determine whether they have been altered or discarded, as the signals traversed the intermediate network 308.

Figure 4:
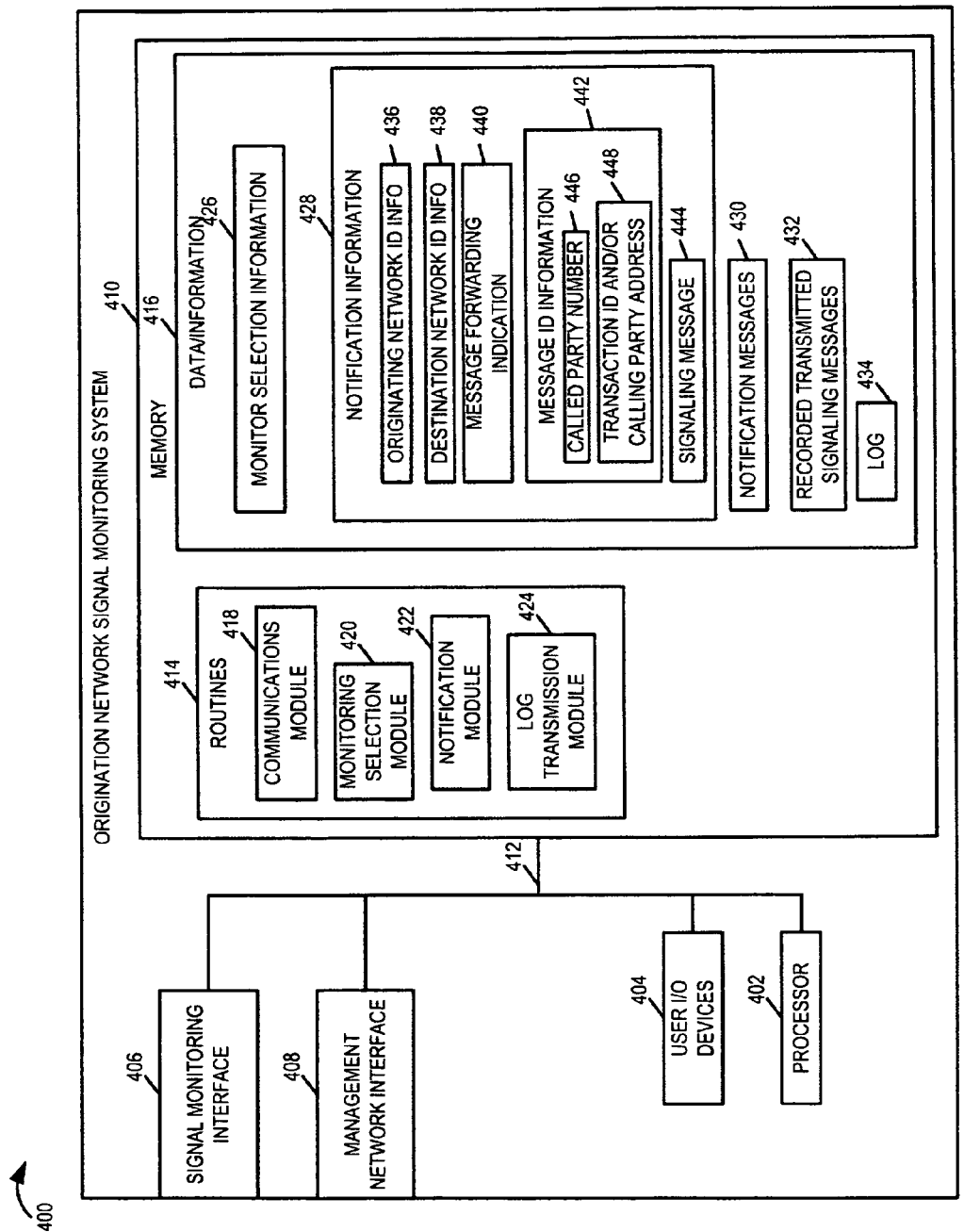
FIG. 4 is a drawing of an exemplary origination network signal monitoring system implemented in accordance with the present invention and using methods of the present invention.

FIG. 4 is a drawing of an exemplary origination network signal monitoring system 400 implemented in accordance with the present invention and using methods of the present invention. Exemplary origination network signal monitoring system 400 may be a detailed representation of any of the signal monitoring systems 316 or 324 of FIG. 3.

System 400 includes a processor 402, user I/O devices 404, a signal monitoring interface 406, a management network interface 408, and memory 410 coupled together via bus 412 over which the various elements interchange data and information. Memory 410 includes routines 414 and data/information 416. The processor 402, e.g., a CPU, executes the routines 414 and uses the data/information 416 in memory 410 to control the operation of system 400 and implement methods of the present invention. User I/O device 404, e.g., keyboards, keypads, touch-pads, mouse, displays, printers, etc., allows an operator and/or administrator of origination network signal monitoring system 400 to select and input monitoring options, e.g., switches, specific identified telephone number(s), blocks of telephone numbers, times to monitor, durations to monitor, signals to monitor, e.g. SS7 IAM, fields within those signals to monitor, calls directed to destination networks 310, etc. User I/O devices 404 also provides feedback to the operator and/or administrator, e.g., indicating when a call to a selected number has been initiated, that a notification message 430 has been sent and/or acknowledged, and/or that a monitored call is in progress.

Signal monitoring interface 406 couples onto output links from switches such as switch 314, or other network elements, e.g., STPs, and allows the monitoring and capturing of signaling traffic, e.g., SS7 signals such as IAM messages.

Routines 414 includes a communications module 418, a monitoring selection module 420, a notification module 422, and a log transmission module 424.

Data/information 416 includes monitor selection information 426, notification information 428, notification messages 430, recorded transmitted signaling messages 432, and a log 434. Notification information 428 includes originating network identification information 436, destination network identification information 438, message forwarding indication information 440, message identification information 442, and signaling message information 444.

Monitor selection information 426 includes information obtained from the user identifying selected monitoring options, e.g., destination switches, specific identified telephone number(s), blocks of telephone numbers, times to monitor, durations to monitor, messages to monitor, e.g. SS7 signals such as IAM messages, fields within those messages to monitor, calls directed to destination networks 310, etc. Notification information 428 includes information that is used to form a notification message 430 and to route the notification message 430. Originating network identification information 436 includes information identifying the originating network e.g., 302, 304, 306, information identifying the geographical relationship between the originating network 302, 304, 306, and the destination network 310 e.g., as belonging to the same or a different LATA, the same or a different state, the same or a different defined area, etc. Destination network information 438 includes information identifying the destination network monitoring equipment 340 to which the notification message 430 should be directed. Message forwarding indication information 440 is information providing a simple indication that a message, e.g., an SS7 IAM, of interest has been transmitted along the signaling path. Message identification information 442 includes specific information such as called party number 446 or calling party address and transaction ID 448 that may allow the identification module 341 to identify the specific signaling message of interest when it arrives at the destination network 310. In the case of a call, the called party number 446 could be used for identification purposes. In the case of a transaction, the transaction ID can be used along with the calling party address 448 for identification purposes. Signaling message 444 is a copy of the transmitted signaling message, e.g. SS7 IAM 344. In some embodiments, signaling message 444 is embedded in the notification message 430, as well, and communicated to the identification module 341. The information in message 444 can be used to rapidly identify the received message in the incoming stream 350 and to subsequently perform a real time or near real time comparison check.

Notification messages 430 are messages including information from notification information 428. Notification messages 428 may have different formats and sizes depending upon the information to be conveyed, e.g., a small, e.g., 1 data byte message providing a command to record a buffer or a larger message informing the identification module 341 of a specific message and/or providing the origination message contents to which the received message should be compared. Recorded transmitted signaling messages 432 are copies of the signaling messages, e.g., identified signaling messages of interest that have been selected, and captured via the signal monitoring interface 406. Log 434 is a collection of recorded transmitted signaling messages 432 and may include addition identification information such as date/time tag information. Log 434 is communicated to the processing center 352 and stored in origination log information 354 to be used for subsequent evaluation.

Communications module 418 performs the various communication protocols used by the origination network signal monitoring system 400 and controls the operation of the interfaces 406, 408. Monitor selection module 420 controls the operation of user devices 404 and obtains sets of monitor selection information 426. Notification module 422 uses the monitor selection information 426, detects outgoing message of interest, records the message as a recorded transmitted signaling message 432, extracts and/or derives notification information 428 from the detected message of interest, generates a notification message 430, and forwards the notification message 430 to the appropriate destination network designated in information 438. In addition notification module 422 transfers recorded transmitted signaling messages 432 into a log 434, optionally, with data/time tag information.

Log transmission module controls the transfer of log 434 to the processing center 352. In various embodiments, various events can cause the transfer to be initiated including: the recorded information in log 434 reaches a predetermined size, a predetermined scheduled time occurs, and/or the processing center 352 issues a request for data transfer.

Figure 5:
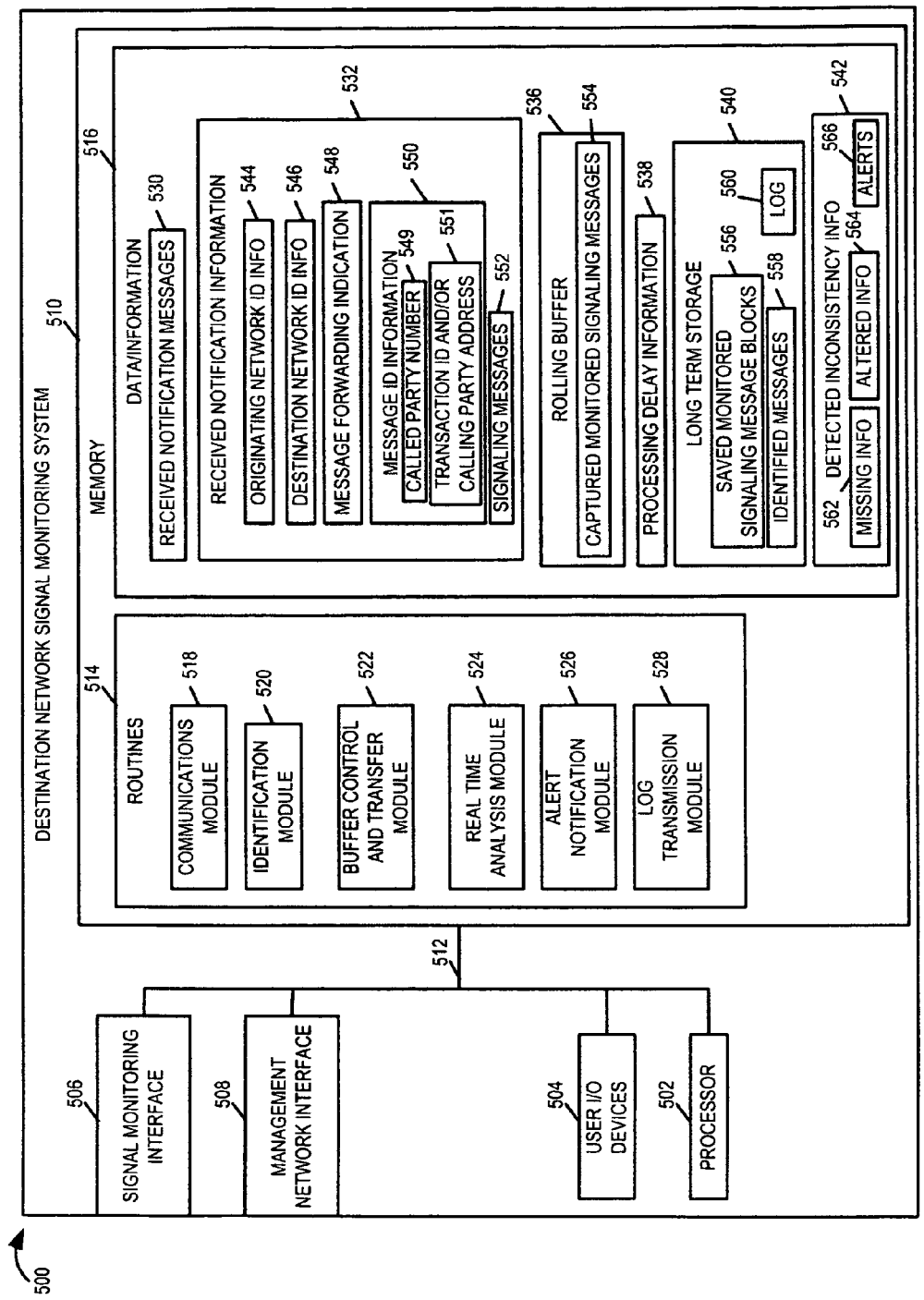
FIG. 5 is a drawing of an exemplary destination network signal monitoring system implemented in accordance with the present invention and using methods of the present invention.

FIG. 5 is a drawing of an exemplary destination network signal monitoring system 500 implemented in accordance with the present invention and using methods of the present invention. Exemplary destination network signal monitoring system 500 may be a detailed representation of the signal monitoring systems 340 of FIG. 3.

System 500 includes a processor 502, user I/O devices 504, a signal monitoring interface 506, a management network interface 508, and memory 510 coupled together via bus 512 over which the various elements interchange data and information. Memory 510 includes routines 514 and data/information 516. The processor 502, e.g., a CPU, executes the routines 514 and uses the data/information 516 in memory 510 to control the operation of system 500 and implement the methods of the present invention. User I/O device 504, e.g., keyboards, keypads, touch-pads, mouse, displays, printers, etc., allows an operator and/or administrator of destination network signal monitoring system 500 to request and obtain monitoring results. User I/O devices 504 also provides alerts to the operator and/or administrator, e.g., indicating when an inconsistency such as an unauthorized altered field in an IAM message has been detected. Alerts are provided in various embodiments of the invention in which the originating network monitoring system 316 and 324 has passed sufficient information in its notification messages 430 to facilitate the required analysis.

Signal monitoring interface 506 monitors signaling links from switches such as switch 334 or other network elements, e.g., STPs, allowing the monitoring and capturing of signaling traffic, e.g., SS7 messages such as IAM messages.

Routines 514 include a communications module 518, an identification module 520, a buffer control and transfer module 522, a real time analysis module 524, an alert notification module 526, and a log transmission module 528. The real time analysis module 524 is implemented in some embodiments of the invention in which sufficient information has been passed in notification messages 430 to facilitate the required analysis but not in some other embodiments.

Data/information 516 includes received notification messages 530, received notification information 532, rolling buffer 536, processing delay information 538, long-term storage 540, and detected inconsistency information 542. Again, detected inconsistency information 542 is implemented in some embodiments of the invention in which sufficient information has been passed in notification messages 430 to facilitate the required analysis but not in some other embodiments.

Received notification messages 530 are received messages, accepted over the management network interface 508, sourced from an origination system 400 e.g., 316 or 324, providing notification that a signaling message of interest has been transmitted, and optionally including information identifying the specific message and/or including a copy of the relevant information included in the signaling message of interest. Received notification messages 530 are in effect, advisories that important data is now resident, or will soon be resident in rolling buffer 536.

Received notification information 532 represents the information extracted and/or derived from the received notification messages 530. Received notification information 532 includes originating network identification information 544, destination network identification information 546, message transmission information 548, message identification information 550, and signaling messages 552.

Originating network identification information 544 includes information identifying the originating network e.g., 302, 304, 306, information identifying the originating network e.g., 302, 304, 306 as belonging to a LATA, a state, a defined area, a defined region, and/or a defined grouping. Destination network information 546 includes information identifying the destination network monitoring equipment 340 to which the notification message 530 is directed. Message transmission indication information 548 is information providing a simple indication that a message, e.g., SS7 IAM, of interest has been transmitted by the originating network towards the destination network. Message identification information 550 includes specific information such as called party number 549 or calling party address and/or transaction ID 551, forwarded by the originating monitoring equipment that may allow the identification module 520 to identify the specific signaling message of interest when it arrives at the destination network monitoring equipment 340. In the case of a call, the called party number 549 could be used, preferably in combination with a time stamp corresponding to the time the call was detected, for identification purposes. In the case of a transaction, the transaction ID and/or calling party address 551 could be used for identification purposes. Message Identification information 550 is implemented in some embodiments of the invention in which sufficient information has been passed in notification messages 430 to facilitate the required selection and/or analysis but not in some other embodiments.

In some embodiments of the invention, signaling messages 552 contain copies of the signaling messages, e.g. SS7 IAM 344 346, received in notification messages 366, 370 and communicated to the identification module 520. The information in message 552 can be used to rapidly identify the received message from the incoming stream 350 and to subsequently perform a real time or near real time comparison check.

Rolling buffer 536 is a fixed capacity buffer into which captured data, such as captured monitored signaling messages 554, can be written. For example, rolling buffer 536 may be capable of holding a fixed amount of information, e.g., 20–30 seconds of captured monitored signaling messages 554 under average traffic loading conditions. Captured monitored signaling messages 554 will, at any particular time, include a window of signaling message stream 350, e.g., any incoming SS7 messages that are candidates for matching, e.g., SS7 IAM messages, received over signal monitoring interface 506. Once the buffer 536 is full, subsequently captured data is stored by overwriting the oldest data in the buffer. Thus, the buffer 536 will remain full and will contain the most recent captured data. Any older data that has not been copied off to long-term storage 540 will be lost.

Processing delay information 538 includes time information that system 500 uses to determine when to process the contents of its rolling buffer 536. There is uncertainty as to whether the actual monitored (call or transaction establishment) signaling message, or the corresponding notification message 430 generated by the originating network's monitoring system 400 will arrive at the destination network's monitoring system 500 first. As a result, the destination network's monitoring system 500 should wait a short interval, e.g., 5 to 10 seconds, after receipt of a notification message before processing the contents of its rolling buffer 536. That processing should examine signaling messages received just prior to the receipt of the notification message, as well as those received just after receipt of the notification message. The processing delay information 538 defines the short interval.

Long-term storage 540 includes saved monitored signaling message blocks 556, identified messages 558 and a log 560. Saved monitored signaling message blocks 556 are blocks of signaling message information, each block representing a dump of current contents, or partial contents of rolling buffer 536 into long-term storage 540. The transfer of a block 554 to long-term storage 556 is triggered by a received notification message forwarding indication 548 and occurs after the appropriate time delay obtained from processing delay information 538. Identified messages 558 include specific signaling messages of interest that have been identified and copied from the rolling buffer 536 into long-term storage 540. In one simple embodiment of the invention, in which the notification message 364, 366 contains no data about the specific call or transaction, searching of the rolling buffer 536 is of no value, and its contents should be transferred, unfiltered, to message blocks 556.

There may be instances where the call is originated, but meets with network congestion in the intermediate network and never arrives at the terminating network. In such cases, a network error message will be generated in at least one of the networks. The network error message should be captured by the originating network monitoring system, and a notification message should be sent to the terminating network monitoring system so that unnecessary traffic data is not stored. The search in rolling buffer 536 and transfer of a specific received signaling message of interest to long-term storage 540 is initiated by received message identification information 550 providing identifying characteristics of the message (e.g., called party number and time of call 549 or transaction ID and/or Calling Party Address 551). The search and comparison process should start after a delay time determined by processing delay information 538. Log information 560 includes blocks of messages 556 and/or messages 558, and represents stored information that is subsequently transferred to destination log information 356 of processing center 352. Log information 560 also includes date/time tag information.

Detected inconsistency information 542 includes missing information 562, altered information 564, and alerts 566. In some embodiments, the destination network signal monitoring system 500 performs an analysis of the information in long term storage 540 to detect inconsistencies 542, e.g., mismatches between an origination network's transmitted signaling message and a destination network's corresponding received signaling message. Missing information 562 includes information pertaining to a field of information, e.g., a JIP 208 in a received IAM message of interest, that was either absent, or did not include any intelligible information when received, despite the fact that the initiated IAM message contained specific information. Missing information may also include instances in which the originating network transmitted a message including the Calling Party Number, but the corresponding message, received by the destination network did not include that parameter. Altered information 564 includes information pertaining to a field of information, e.g., a Charge Number parameter 206 in a received IAM of interest, that differs from that sent by the originating network. Alerts 566 includes warnings that are issued to the user via the user I/O interface 504 when missing information 562 or altered information 564 has been detected.

Communications module 518 performs the various communication protocols used by the destination network signal monitoring system 500 and controls the operation of the interfaces 506, 508. Identification module 520 uses the received notification information 532 including message forwarding indication 548, message ID information 550, and/or signaling messages 552 to identify triggers for activating a transfer of some or all of the contents of rolling buffer 536 to blocks 556 of long term storage 540 and/or for activating message searches within rolling buffer 536 and a transfer of a detected signaling message of interest to identified messages 558 of long term storage 540. The buffer control and transfer module 522, when called by the identification module 520, uses the processing delay information 538 and controls the transfer of data/information from the rolling buffer 536 to long term storage 540 at the appropriate time to store the message(s) of interest for further analysis. Real time analysis module 524 evaluates the saved information in long-term storage 540 against signaling messages 552 and, to the extent possible, consistent with the information received in the notification message, detects missing information 562 and/or altered information 564. Real time analysis module 524 performs checks and detection of inconsistencies in real time or near real time, e.g., in some cases detecting fraud by an intermediate carrier 308 while the call is still in progress.

In cases where the notification messages contain sufficient information to assess whether information has been modified or removed, alert notification module 526 uses the detected missing info 562 and/or detected altered information 564 to issues alerts 566, e.g., warnings such as the activation of an audio alarm over the user I/O interface 504 to notify an operator and/or administrator of potential fraud. Alert notification module 526 may also, in some embodiments, issue alerts 566 to the management network 309. Such communicated alerts 566 may individually and/or based on statistical results, trigger notifications to outside authorities, e.g., law enforcement and regulatory agencies.

The management network 309 may also use the communicated alerts to signal originating networks 302, 304 with additional monitor selection information 426 to further isolate and/or obtain evidence on a suspect specific interchange carrier.

In some embodiments of the invention, the management network 309 may make the determination that message information has been modified or removed. In these cases, it may issue alerts to the origination network monitoring system 400 and/or the destination network monitoring system 500.

Log transmission module 528 controls the transfer of log 560 to the processing center 352. In various embodiments, various events can cause the transfer to be initiated including: the recorded information in log 560 reaches a predetermined size, a predetermined scheduled time occurs, the processing center 352 issues a request for data transfer, and/or an alert 566 is issued.

FIG. 6, comprising the combination of FIGS. 6A, 6B, 6C, 6D, and 6E, is a flowchart of an exemplary method of operating a call monitoring system in accordance with the present invention. Operation starts at step 602 and proceeds to step 604. In step 604 the call monitoring system components, e.g., origination network signal monitoring systems 400, destination network signal monitoring system 500, and management network 309 including processing center 352, are initialized. From step 604, operation proceeds to step 610 for operations of the origination networks, to step 638 for operations of the destination network, and to step 684 for operations of the management network.

In step 610, the originating network signal monitoring system is operated to receive monitor selection information 606, 608. Monitor selection information 606, e.g., a specific identified called party, is derived from operator and/or local administrator input communicated over the user interface. Additional monitor selection information 608 is an output from the management network 309 and may include feedback information identifying specific telephone numbers that may result in additional traffic generation through a specific interchange carrier's network under observation. From step 610, operation continues in step 612 with steps 610, 612 being performed throughout the time the communication system is in operation. In step 612, the originating network, handling subscriber-generated outbound calls to destinations including those identified as targets in the destination network and generating appropriate SS7 messages. At least some such calls should be handed off to an intermediate network for delivery to the destination network. "Operation proceeds from step 612 via connecting node A 616 to step 620.

In step 620, the originating network signal monitoring system is operated to monitor one or more switch and/or network SS7 output messages. Monitoring in step 620 is performed on an on-going basis. Each time an SS7 message is detected in step 620, processing performed relating to the detected message starts in step 622. In step 662 the switch's output SS7 message detected in step 620 is checked to see if it is an IAM message that satisfies the monitor selection criteria received in step 610. In flowchart 600, the IAM SS7 message has been used as an example for the purposes of explanation; however, other signaling message(s), e.g., an SS7 SSCP message may be tracked in place of or in addition to the IAM message. Also, additional SS7 messages, associated with call setup can be tracked, e.g., Address Complete messages (ACM), Answer messages (ANM), Release messages (REL) or Release Complete messages (RLC). If in step 622, the monitoring criteria have not been satisfied, operation proceeds to step 623 and the processing relating to the detected message stops. However, if in step 622, the IAM satisfied the monitor selection criteria, then operation proceeds to step 624, where the origination network signal monitoring system is operated to record the transmitted SS7 IAM in its log. Operation proceeds from step 624 to step 626. In step 626, the origination network signal monitoring system is operated to generate a notification message including a message transmission indication and possibly some message identification information. The generated notification message can, in some embodiments, also include a copy of the SS7 message or the called party number, or a set of information representing portions of the SS7 message that should not be altered during transmission through an intermediate network. Next, in step 628, the origination network signal monitoring system communicates the notification message 630 to the management network, to be forwarded to the terminating network signal monitoring system. Operation proceeds from step 628 to step 632. In step 632, the origination network signal monitoring system communicates the origination network log 634 to the processing center in the management network. Various criteria may be used to trigger transmission of the log 634, including reaching a threshold for information stored in log 634, a request from the management network, and/or an alert.

Procedures for performing the destination network signal monitoring function also begin at step 604 and then proceed to step 638, where the destination network signal monitoring system is operated to continuously receive and store SS7 signals 636 from the intermediate network, and optionally, any other intermediate network connection to whose links the monitoring system has access, e.g., Competitive Local Exchange Carriers or Certified Local Exchange Carriers (CLECs) which deliver calls and their associated messages to the destination network. The received messages which may be originally sourced from a plurality of originating networks are stored in a rolling buffer. In step 642, the destination network signal monitoring system is operated to monitor and store a notification message 640 from the management network. Operation proceeds from step 642 via connecting node B 644 to step 646 of FIG. 6c.

In step 646, the destination network signal monitoring system extracts notification information from the received notification message 640. Then, in step 648, the destination network signal monitoring system uses the received notification information obtained in step 646 to control the storage of received SS7 messages. For example, the received notification information may include a message transmission indication and/or message identification information. The received notification information may be used to determine the type of data transfer to be performed from the rolling buffer, e.g., an entire or partial buffer dump or the extraction and recording of an individual message(s). The received notification information may also be used in conjunction with processing delay information to determine a delay time to wait following reception of the notification message before beginning the message storage process. Such delay times are used to account for the uncertainty in the differences in arrival time between the SS7 messages traversing the intermediate network and the notification messages traversing the management network, and may be set to provide a high level of confidence that the SS7 message(s) of interest will be captured and stored.

Next, in step 650 a check is performed by the destination network signal monitoring system to see if specific message identification information e.g., the called party number is available. If specific ID information is not available operation proceeds to step 652, where a check is performed to determine if the delay time, i.e., time from the reception of the notification message to when data storage should start, has been reached. If the delay time was reached, operation proceeds to step 656, otherwise operation proceeds to wait step 654, to introduce a delay, and then operation proceeds again to step 652 to recheck if the delay time has been reached. In step 656, the destination network signal monitoring system is operated to dump the current rolling buffer to long-term storage. From step 656, operation proceeds to step 658, in which the saved information is used to update the system log.

Returning to step 650, if specific message of interest ID information is available, operation proceeds to step 660, where a check is performed to determine if the delay time, e.g., delay time from the reception of the notification message to when the search of the rolling buffer should start, has been reached. If the delay time was reached operation proceeds to step 664, otherwise operation proceeds to wait step 662, to introduce a delay, and then operation proceeds again to step 660 to recheck if the delay time has been reached.

In step 664, the destination network monitoring system is operated to search the rolling buffer for the specific SS7 IAM message(s) of interest. Note that, if the identifying information includes the Called Party Number, it is possible that there will be multiple IAMs stored within the rolling buffer, representing multiple calls placed to the same telephone number. In this case, it may be desirable to either select all candidate IAMs, or to identify the proper IAM through the use of other information, e.g., other signaling messages associated with the same call. Operation proceeds from step 664 to step 666, where the destination network monitoring system is operated to copy the IAM message(s) of interest, when found, into long-term storage. Operation proceeds from step 666 to both step 658 and connecting node D 672.

In step 658, the destination network signal monitoring system updates its log. The log may be updated to include stored information from step 656 or step 666, date/time tag information, and/or origination and destination network identification information. Operation proceeds from step 658 to step 668.

In step 668, the destination network signal monitoring system communicates the destination network log 670 to the processing center in the management network. Various criteria may be used to trigger transmission of the log 670 including a certain amount of information stored in log 670 being reached, a request from the management network, and/or an alert. The fact that 668 directly follows 658 should not be interpreted to mean that the log is communicated to the processing center in the management network each time it is updated. As indicated above, the transfer of log information can be triggered by any of a number of different circumstances.

Figure 6A:
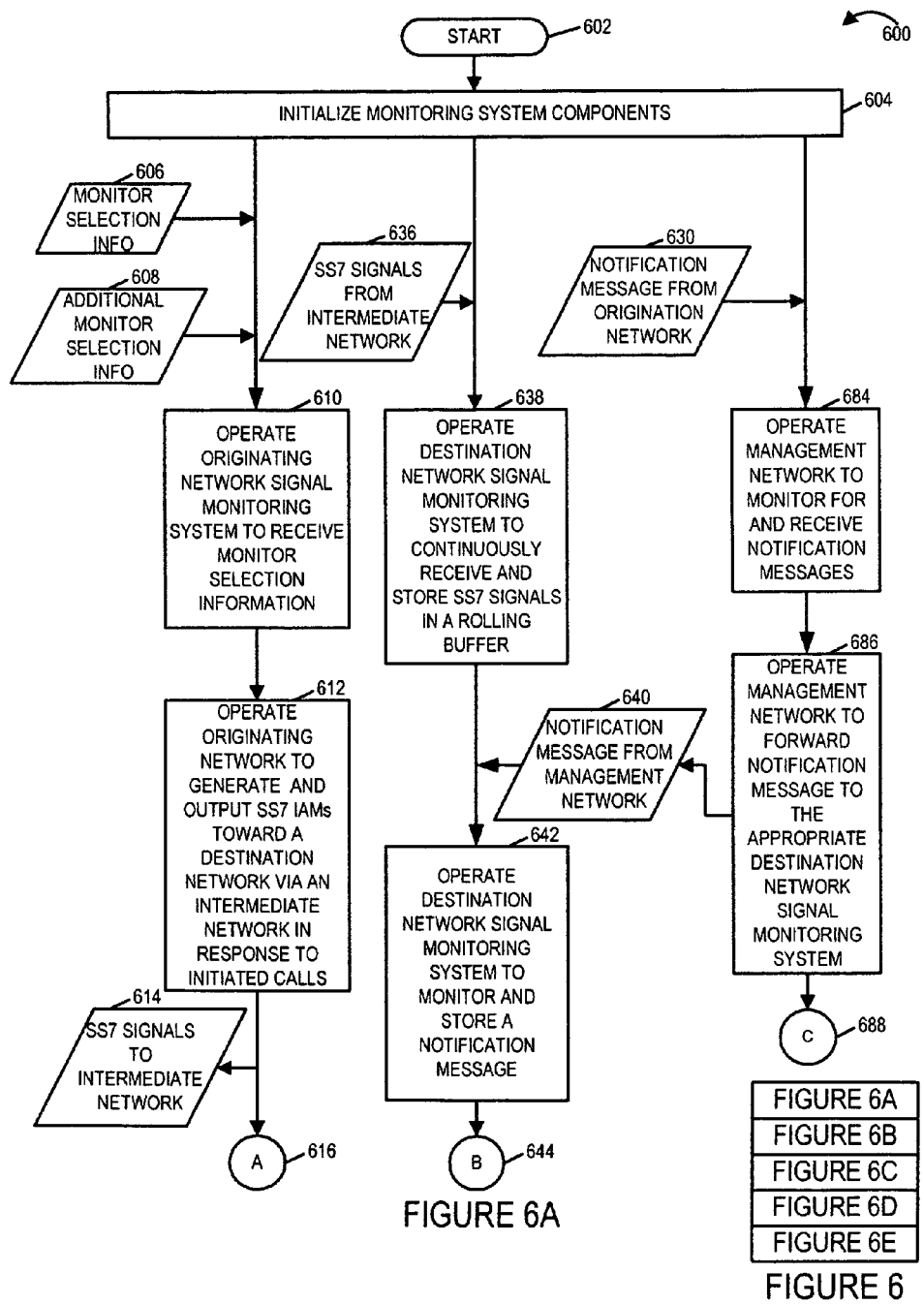
FIG. 6, comprising the combination of FIGS. 6A, 6B, 6C, 6D, and 6E, is a flowchart of an exemplary method of operating a call monitoring system in accordance with the present invention.
Figure 6B:
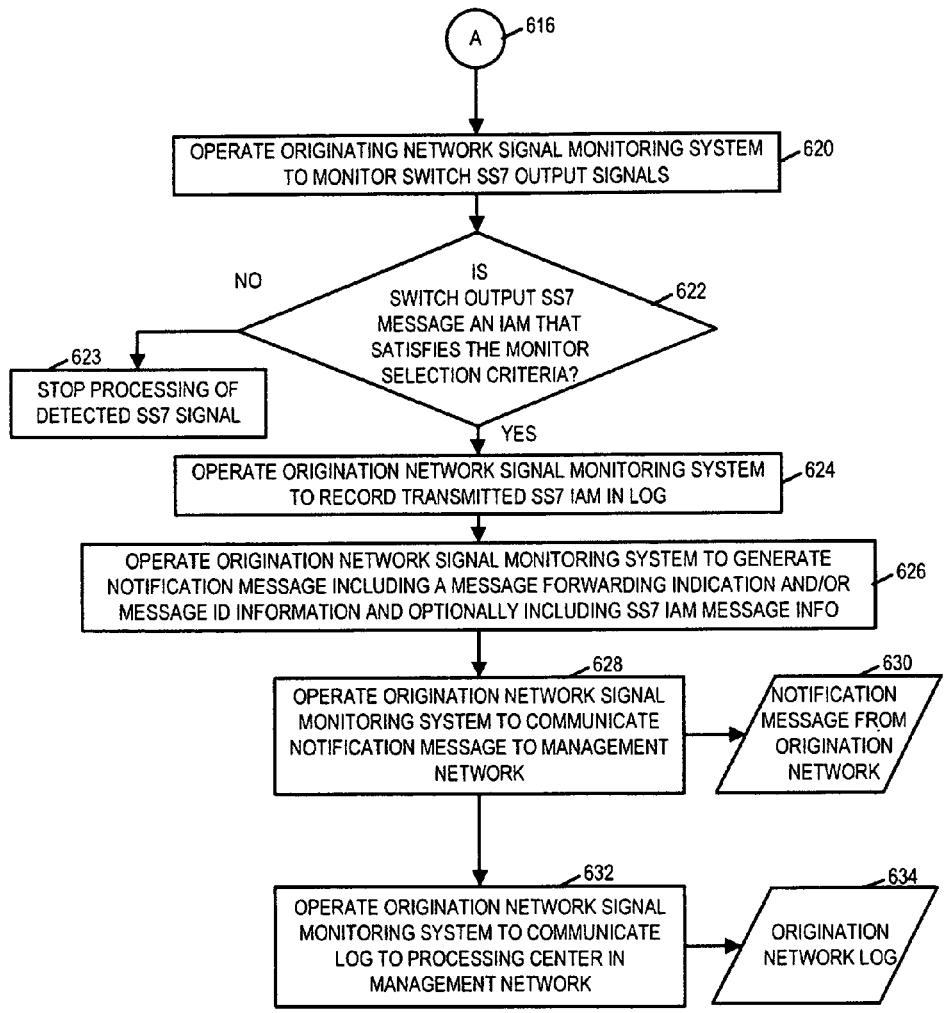
Figure 6C:
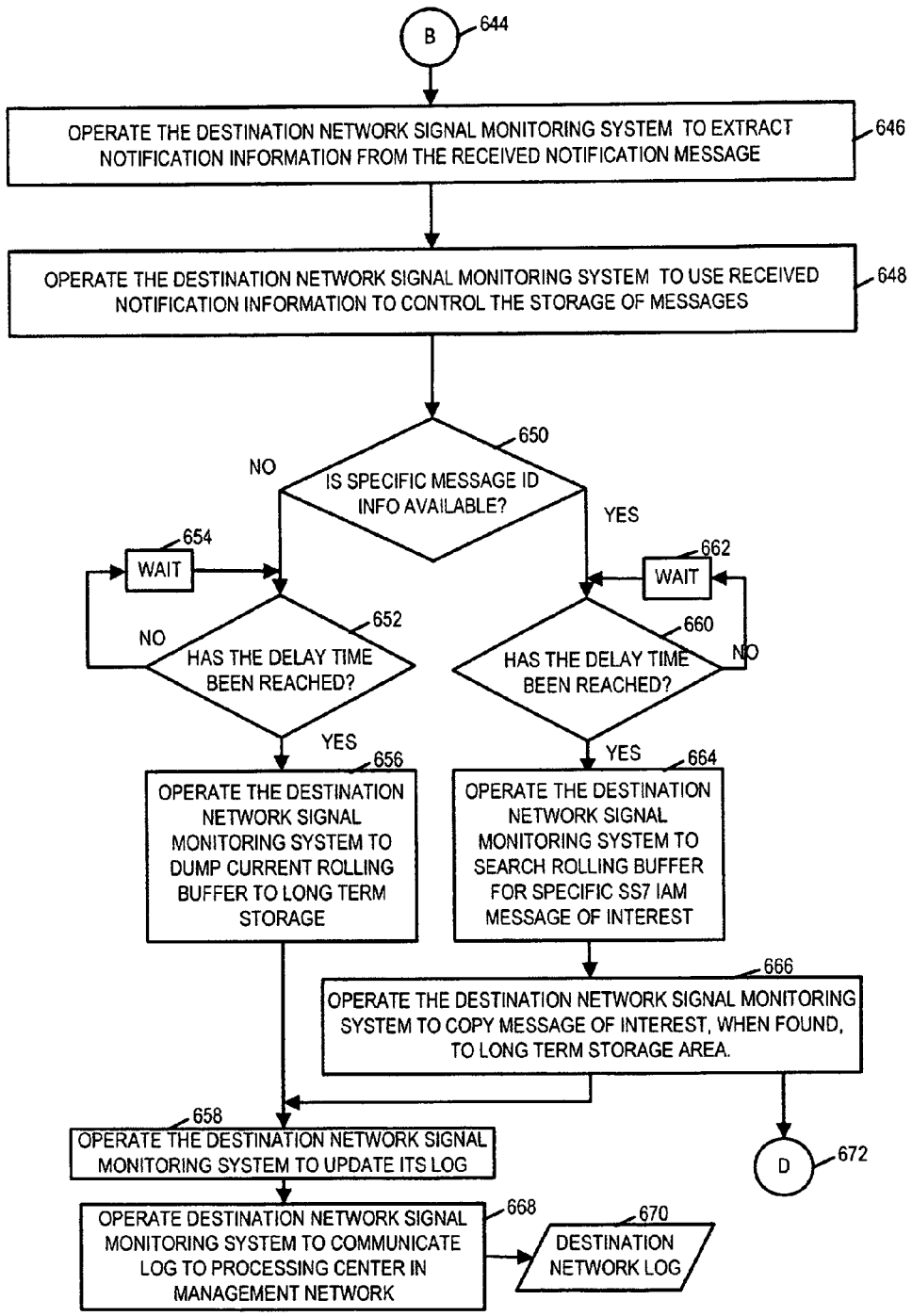
Figure 6D:
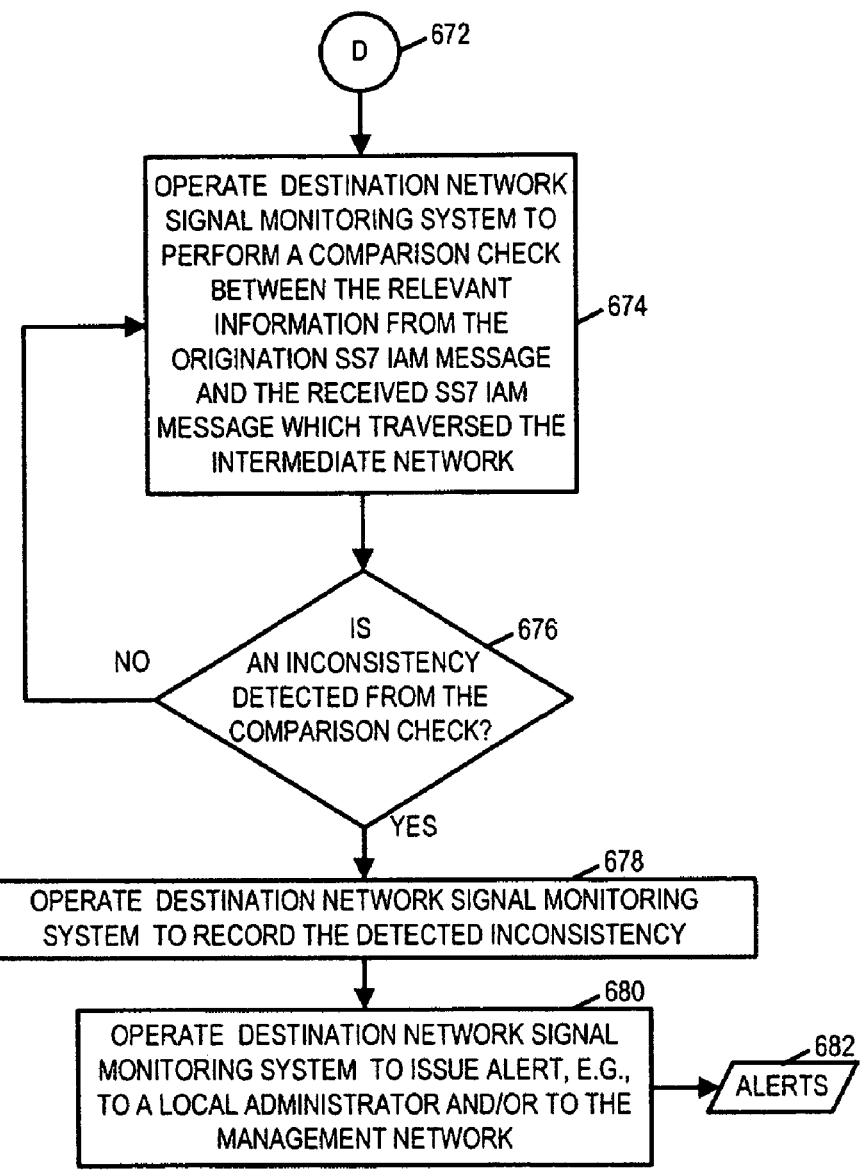

From connecting node D 672, operation proceeds to step 674 of FIG. 6D, where the destination network signal monitoring system is operated to perform a comparison check between the relevant information from the origination SS7 IAM, communicated in the notification message via the management network, and the received SS7 IAM which traversed the intermediate network. In step 676 a comparison check is made to determine if there is an inconsistency detected from the comparison check, operation proceeds to step 678. If there is not an inconsistency, operation proceeds back to step 674 to check any additional messages of interest which may been recorded.

In step 678, the destination network signal monitoring system is operated to record the detected inconsistency. Then, in step 680, the network signal monitoring system issues an alert 682, e.g., to a local administrator via the user I/O interface 504 and/or to the management network 309.

Figure 6E:
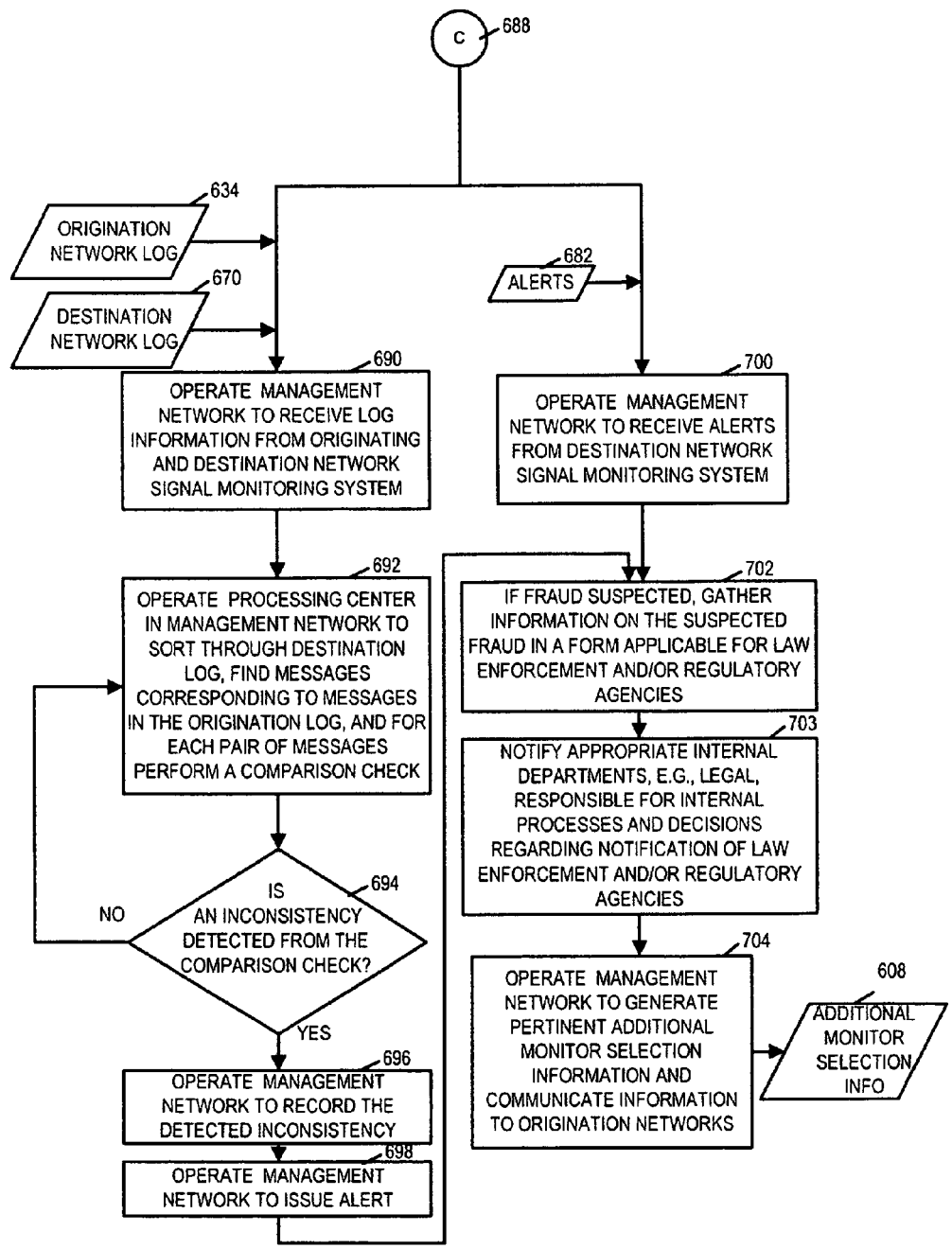

Returning to step 604, in step 684, the management network is operated to monitor for and receive notification messages 630 from the origination network. Then, in step 686, the management network is operated to forward the notification message 640 to the appropriate destination network signal monitoring system. Operation proceeds from step 686 via connecting node C 688 to step 690 and step 700 (FIG. 6E).

In step 690 the management network is operated to receive origination network log information 634 from origination network signal monitoring systems and destination network log information 670 from the destination network signal monitoring system. Then, in step 692, the processing center in the management network is operated to sort through the destination log, find messages corresponding to messages in the origination log, and for each pair of messages perform a comparison check. Operation proceeds from step 692 to step 694. In step 694, if an inconsistency is detected from the comparison, operation proceeds to step 696; otherwise, operation proceeds back to step 692 where another comparison is performed for an additional pair of messages until all possible messages from the originating network have been matched and compared. In step 696, the management network is operated to record the detected inconsistency. Then in step 698, the management network is operated to issue an alert and operation proceeds to step 702.

Returning to step 700, the management network 700 is operated to receive alerts 682 from the destination network signal monitoring system, and then operation proceeds to step 702.

In step 702 if fraud is suspected, the management network is operated to gather information on the suspected fraud in a form that would be applicable for law enforcement and/or regulatory agencies. Operation proceeds from step 702 to step 703. In step 703, the management network is operated to notify appropriate internal departments, e.g., the legal department, responsible for internal processes and decisions regarding notification of law enforcement and/or regulatory agencies of suspected fraud activities. Operation proceeds from step 703 to step 704. In step 704, the management network is operated to generate pertinent additional monitor selection information 608 and communicate such information to the origination network. The additional monitor selection information 608 may include information selected to facilitate the collect of additional information on a specific suspect intermediate carrier.

Numerous variations on the above described methods and apparatus are possible while remaining within the scope of the invention. For example, while explained in the context of LATAs as exemplary local areas, other local areas may be used in accordance with the invention.

What is claimed is:

1. A method of monitoring at least one telephone call-related signaling message in a communications system including a source network and a destination network coupled together by an intermediate network, first and second communications paths extending between said source and destination network, the first and second communications paths being different, the method comprising:
monitoring a first telephone call-related signaling message originating from said source network that is directed to said destination network via the second communications path;
creating a copy of at least a portion of said first telephone call-related signaling message;
sending a notification message from said source network to said destination network using said first communications path, indicating to the destination network that a message of interest, containing information supplied by the source network, is being communicated to said destination network;
sending said first telephone call-related signaling message to said destination network through said intermediate network using said second communications path;
operating said destination network to receive said notification message;
receiving from said intermediate network a telephone call-related signaling message corresponding to the first telephone call-related signaling message; and in response to said received notification message sending at least a portion of said received telephone call-related signaling message corresponding to the first telephone call-related signaling message to a long-term storage device.

2. The method of claim 1, further comprising:
operating the source network to send said copy of at least a portion of said first telephone call-related signaling message to a processing device; and
operating the processing device to compare at least a portion of said copy of at least a portion of said first telephone call-related signaling message to a corresponding portion of said received telephone call-related signaling message to determine if the compared message portions are inconsistent.

3. The method of claim 2, wherein said processing device determines if the compared message portions are inconsistent while a call to which the message portions relate is ongoing.

4. The method of claim 2, wherein said processing device generates a fraud warning when it is determined that the compared message portions are inconsistent.

5. The method of claim 2, wherein said first telephone call-related signaling message is an SS7 message related to a telephone call that originates from said source network and terminates in said destination network.

6. The method of claim 5, wherein said call notification message is communicated to said destination network over a management network which provides at least a portion of said first communications path.

7. The method of claim 5, said first telephone call-related signaling message is communicated over an inter-carrier network that forms part of the second communications path.

8. The method of claim 7, wherein said processing device is located in said destination network.

9. The method of claim 7 wherein said processing device is located in a processing center, said processing center including said long-term storage device, the method further comprising:
operating the processing center to receive said at least a portion of said received telephone call-related signaling message corresponding to the first telephone call-related signaling message sent by the source network; and
operating the processing center to receive said copy of at least a portion of said received first telephone call-related signaling message.

10. The method of claim 9 wherein said processing center is collocated with equipment comprising part of said management network.

11. The method of claim 9 wherein said processing center is controlled by an operator that operates said destination network.

12. The method of claim 9, wherein the source network, destination network and intermediate network are operated by different telephone service providers.

13. The method of claim 9, wherein the source network, and destination network are operated by the same telephone service provider and the intermediate network is operated by a different telephone service provider.

14. The method of claim 7 wherein at least a portion of said inter-carrier network over which said first telephone call-related signaling message is communicated is an IP network which uses IP packets to communicate said telephone call-related signaling message.

15. The method of claim 2, wherein said comparison indicates that the compared message portions are inconsistent when the compared message portions are not the same.

16. The method of claim 15, further comprising:
when said compared message portions are inconsistent further determining if the received telephone call-related signaling message portion is missing information or includes valid information which changed from corresponding valid information included in the transmitted first telephone call-related signaling message.

17. The method of claim 2, further comprising:
temporarily storing received telephone call-related signaling messages in a buffer in said destination network; and
wherein said step of sending at least a portion of said received telephone call-related signaling message corresponding to the transmitted first telephone call-related signaling message to a long-term storage device includes processing the contents of the buffer in response to said call notification message.

18. The method of claim 17, wherein said processing the contents of the buffer include:
transferring the contents of at least a portion of said buffer including multiple call-related messages to said long-term storage.

19. The method of claim 18,
wherein said call notification message includes message identification information which can be used to identify a call-related signaling message of interest sent from said source network; and
wherein said step of transferring the contents of at least a portion of said buffer include:

identifying said received telephone call-related signaling message corresponding to the first telephone call-related signaling message in said buffer contents using said message identification information; and wherein said contents of at least a portion of said buffer transmitted to said long-term storage in response to said call notification message include said identified received telephone call-related signaling message.

20. The method of claim 1, wherein the first and second communications paths are independent communications paths.

21. A communication system comprising:

a source network; and a destination network including a second message monitoring device, the source network being coupled to said destination network by first and second communications paths extending between said source and destination networks, the first and second communications paths being different, said second communications path traversing at least a portion of an intermediate communications network which is included in at least a portion of said second communications path;

wherein the source network includes:
   i) a first message monitoring device for monitoring at least a first telephone call-related signaling message originating from said source network that is directed towards said destination network;
   ii) a means for creating a copy of at least a portion of said first telephone call-related signaling message; and
   iii) means for sending a notification message from said source network to said destination network using said first communications path, indicating to the destination network that a corresponding call-related signaling message of interest is being communicated to said destination network based on a call-related signaling message sent from said source network; and
   iv) means for communicating at least a portion of said first telephone call-related signaling message to said destination network through said intermediate network using said second communications path; and wherein the destination network includes:
   i) means for receiving said notification message;
   ii) means for receiving from said intermediate network a telephone call-related signaling message corresponding to the first telephone call-related signaling message originated by said source network; and
   iii) message storage control means, responsive to said received notification message, for copying and sending at least a portion of said received telephone call-related signaling message corresponding to the first telephone call-related signaling message to a long-term storage device.

22. The system of claim 21, further comprising:

a message verification device coupled to said source and destination networks, said message verification device receiving said copy of at least a portion of said first telephone call-related signaling message and comparing at least a portion of said copy of at least a portion of said first telephone call-related message to a corresponding portion of said received telephone call-related signaling message to determine if the compared message portions are inconsistent.

23. The system of claim 22, wherein said message verification device operates in real time to determine if the compared signaling message portions are inconsistent while a call to which the message portions relate is still ongoing.

24. The method of claim 23, wherein said message verification device is located in said destination network.

25. The method of claim 23, wherein said destination network further includes:

a buffer for temporarily storing received telephone call-related signaling messages; and means for identifying said received telephone call-related signaling message corresponding to the first telephone call-related signaling message in said buffer contents using said message identification information.

\* \* \* \* \*